Patented June 10, 1924.

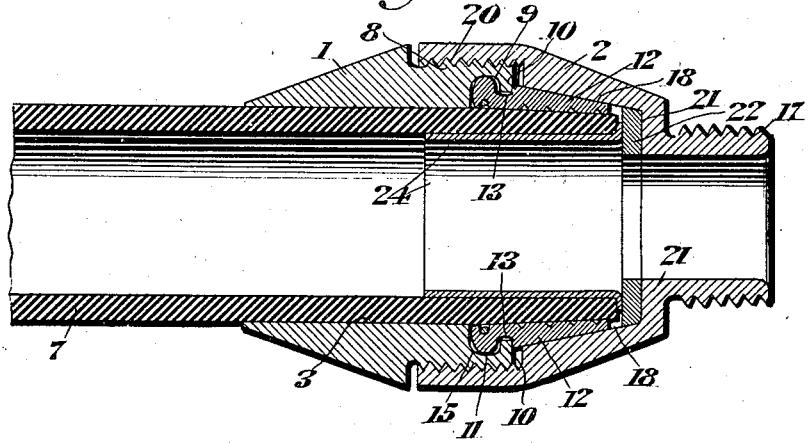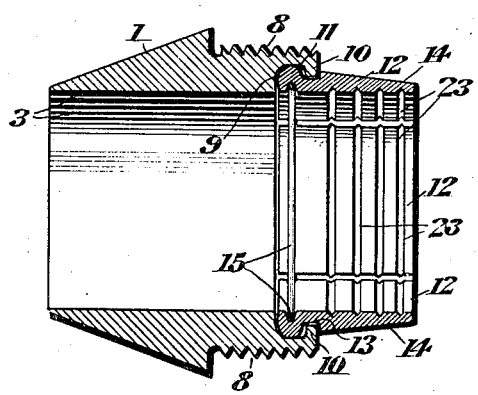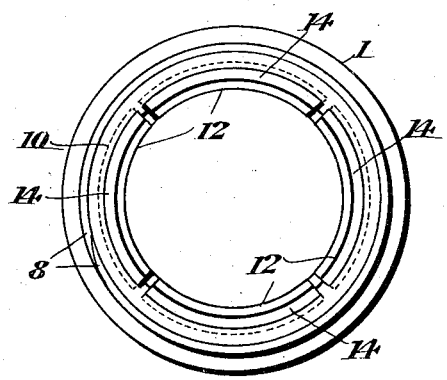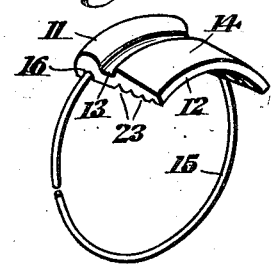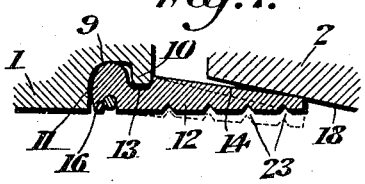

1,497,453

UNITED STATES PATENT OFFICE.

SAMUEL LEVITT, OF BROOKLYN, NEW YORK, ASSIGNOR TO UNITED METAL HOSE COMPANY, INC., OF NEW YORK, N. Y., A CORPORATION OF NEW YORK.

PIPE COUPLING.

Application filed March 27, 1920. Serial No. 369,293.

*To all whom it may concern:*

Be it known that I, SAMUEL LEVITT, a citizen of Russia, and resident of the borough of Brooklyn, county of Kings, city and State of New York, have invented certain new and useful Improvements in Pipe Couplings, of which the following is a specification.

This invention relates to improvements in pipe couplings, and more particularly to couplings for detachably connecting a flexible pipe or hose to a conduit, outlet fitting, faucet, or the like.

The invention has for its principal objects to provide a pipe coupling having members so constructed that they may be readily disconnected from each other and from the ends of the conduits, pipes, or hose sections to which they are attached; to provide a detachable pipe coupling having detachably connected coupling members and means operable by the act of connecting said members for securely locking one of said members on a rubber hose or other pipe or conduit without mutilating or deforming any part of the coupling; and to provide a detachable pipe coupling so constructed that its members may be readily removed from the pipe or conduit sections to which they are attached with the aid of a wrench without destroying or mutilating any part of the coupling.

Figure 1:
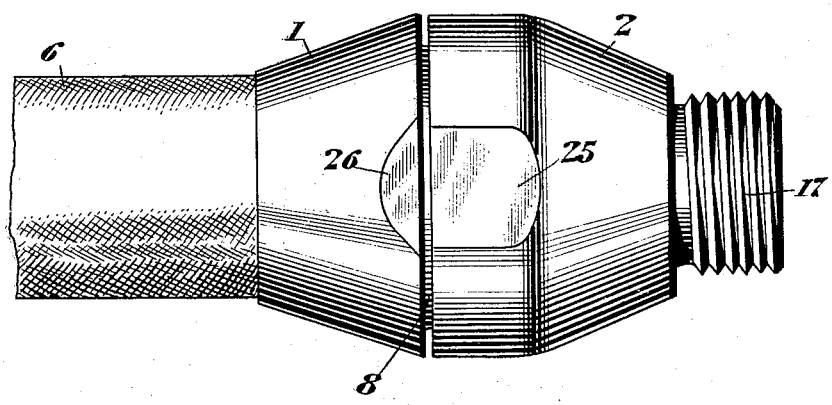
Figure 2:
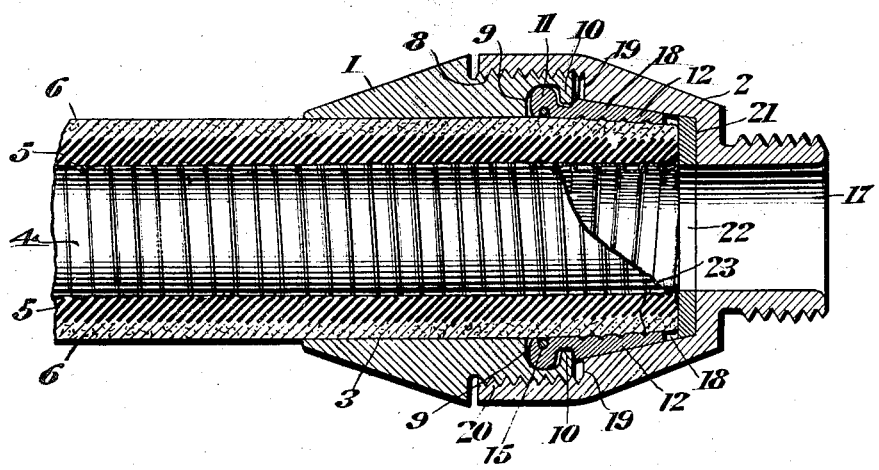

In the accompanying drawings:

Figure 1 is a side elevation showing the parts of the coupling in assembled relation with a section of rubber and fabric covered flexible metallic tubing;

Fig. 2 a central longitudinal section of the assembly shown in Fig. 1;

Fig. 3 a view similar to Fig. 2 showing the coupling assembled with a section of rubber hose;

Fig. 4 a longitudinal section showing one of the coupling members and the pipe or hose gripping means carried thereby;

Fig. 5 an end view of the assembly shown in Fig. 4;

Fig. 6 a perspective view showing one of the gripping devices and the expansion ring for the gripping devices; and Fig. 7 a detail longitudinal sectional view illustrating the rocking gripping movement of the gripping devices.

Referring to the drawings by numerals, 1 and 2 designate the two detachably connectible members of the coupling. The coupling member 1 is formed with a cylindrical axial bore 3 to adapt the member to be slipped on the end of a pipe, rubber hose, or other flexible conduit. In Figs. 1 and 2 the member 1 is shown mounted on a flexible conduit of well known construction comprising a non-collapsible but universally flexible metallic tube 4 provided with a layer or sheath of rubber 5 and an outer fabric covering 6. In Fig. 3 the member 1 is shown mounted on one end of an ordinary rubber hose 7.

The member 1 is externally threaded at its outer end at 8 and is provided with an internal circumferential groove or channel 9 closely adjacent its outer end having rounded side and bottom walls. The internal bore of the member 1 is enlarged from the outer side of channel 9 to the outer end of the member to form a narrow internal annular shoulder or flange 10 at the outer end of said member, the inner edge of which flange is spaced from the outer surface of the hose or conduit upon which the member 1 is mounted.

The channel 9 forms a seat for the rounded shoulders or fulcrum portions 11 formed at the inner ends of a circular series of arcuate gripping devices 12. The devices 12 taper or decrease in thickness toward their outer ends which, when the member 11 is placed on the hose or conduit, preferably lie close to or flush with the end of the hose or conduit. Each arcuate gripping device 12 is provided with an external transverse channel 13, between the shoulder 11 and the beveled outer surface 14 thereof, to receive the flange 10 on member 1. The circular series of gripping devices are held in interlocked relation with the member 1 by means of a resilient metallic expansion ring 15 seated in transverse channels 16 formed in the inner faces of the gripping devices 12 adjacent the inner ends of said devices. Said gripping devices thus together form a pipe gripping ring which has a plurality of gripping portions adapted to be forced into engagement with the pipe.

The member 2 is formed with a tubular extension 17 at its outer end which may be externally threaded, as shown, or otherwise adapted for attachment to a conduit, faucet, or the like. The member 2 is provided with an intermediate tapering axial bore 18 the walls of which gradually converge toward the outer end of the member, and said member is also provided with an internal shoulder 21 at the outer end of the bore 18. The axial bore of member 2 is enlarged and made cylindrical from the inner end of the tapered bore 18 to the inner end of said member, thus forming an internal shoulder 19 adapted to abut against the outer edge of flange 10 on member 1 to limit the relative movement of the coupling members toward each other. This enlarged cylindrical portion of the member 2 is internally threaded as shown at 20 to adapt the coupling members 1 and 2 to be connected and disconnected by threading the inner end of member 2 on the outer threaded end 8 of member 1. A compressible packing ring 22 is preferably interposed between the end of the hose or pipe and the shoulder 21 on member 2 so as to be compressed between the end of the hose or pipe and said shoulder and thus prevent leakage around the end of the hose or pipe.

The walls of the tapered bore 18 of member 2 converge toward the axis of said member more abruptly than the surfaces 14 of the gripping devices 12, so that when the members 1 and 2 are connected together the tapered inner surface 18 of member 2 contacts with the tapered surfaces 14 of devices 12 at the outer ends of said devices and gradually rocks the outer ends of the devices inwardly, the shouldered inner portions 11 of said devices turning in the channel 9 and forming the pivots of the gripping devices. The gripping devices 12 are thus pressed tightly against the yieldable outer covering of the metallic conduit shown in Figs. 1 and 2, or the rubber hose shown in Fig. 3, compressing the same as shown in Figs. 2 and 3. The extent of compression gradually increases toward the outer ends of the gripping devices. To increase the locking action of the gripping devices each of said devices is preferably provided with a series of transverse grooves 23 into which the yieldable pipe covering, or the yieldable material of which a hose is formed, will be forced. The metal tubing 4, in the conduit shown in Figs. 1 and 2, serves to prevent collapsing of the conduit under pressure of the gripping devices, and in the construction shown in Fig. 3 a metal sleeve or thimble 24 is provided to prevent collapsing of the rubber hose 7.

The member 2 is provided with flat surfaces 25 at opposite sides thereof to permit the same to be securely gripped by a wrench, and the member 1 is provided with similar flat surfaces 26.

While I have described but one preferred form of my invention, it is to be understood that it is not limited to such form, but is capable of modification. I do not, therefore, intend the appended claims to be limited to the specific form illustrated, but intend to cover my invention broadly in whatever form its principles may be embodied.

What I claim is:

1. A pipe coupling comprising a sleeve adapted to be slid upon the end of a conduit, a plurality of gripping devices having an interlocking rocking connection at one end with the outer end of said sleeve, and a member having an axial passage therethrough in alignment with the passage through the sleeve having tapering walls adapted to engage the free ends of said devices and rock the same inwardly upon relative endwise movement of member and sleeve toward each other, said sleeve and member being provided with complementary screw threaded portions for detachably connecting the same end to end, and said member being formed with an internal shoulder between which and the end of a conduit upon which the sleeve is mounted, a packing may be compressed.

2. A pipe coupling comprising a pair of tubular members provided with means for detachably connecting the same, one of said members being formed with a circumferential internal channel adjacent one end and having its bore enlarged from said channel to the end of the member to form an internal flange spaced from a conduit on which the member is mounted, and a circular series of arcuate gripping devices each having a rounded end portion seated in said channel and a transverse groove into which said flange extends to form an interlocking rocking connection with said channeled member, the projecting free end portions of said devices having beveled outer faces inclining toward the outer ends of the devices and the other tubular member having a portion of its bore tapered more abruptly than the beveled faces of the gripping devices and adapted to embrace and rock said devices inwardly when the members are connected.

3. A pipe coupling comprising a pair of tubular members provided with means for detachably connecting the same, one of said members being formed with a circumferential internal channel adjacent one end and having its bore enlarged from said channel to the end of the member to form an internal flange spaced from a conduit on which the member is mounted, a circular series of arcuate gripping devices each having a rounded end portion seated in said channel and a transverse groove into which said flange extends to form an interlocking rocking connection with said channel member, the projecting free end portions of said devices having beveled outer faces inclining toward the outer ends of the devices and the other tubular member having a portion of its bore tapered more abruptly than the beveled faces of the gripping devices and adapted to embrace and lock said devices inwardly when the members are connected, each of said devices having a transverse channel in its inner face in alignment with the channel in the coupling member, and a resilient expansion ring seated in the channels in said gripping devices.

4. A pipe coupling comprising a sleeve having an externally threaded portion at one end and an internal circumferential channel adjacent the threaded end thereof, a plurality of gripping devices having transverse ribs at one end seated in said channel and adapted to rock therein, each of said devices having a transverse groove in its inner face in alignment with the rib thereon, a resilient expansion ring sprung into the grooves in said devices, and a tubular coupling member having an internally threaded portion at one end adapted to be screwed on the externally threaded portion of said sleeve and having a portion of its bore tapered so that the sides thereof will engage and rock the free ends of the gripping devices inwardly when the member is screwed on the sleeve.

5. A pipe coupling comprising a sleeve having an externally threaded portion at one end and an internal circumferential channel adjacent the threaded end thereof, a plurality of gripping devices having transverse ribs at one end seated in said channel and adapted to rock therein, each of said devices having a transverse groove in its inner face in alignment with the rib thereon, a resilient expansion ring sprung into the grooves in said devices, and a tubular coupling member having an internally threaded portion at one end adapted to be screwed on the externally threaded portion of said sleeve and having a portion of its bore tapered so that the sides thereof will engage and rock the free ends of the gripping devices inwardly when the member is screwed on the sleeve, said member having a threaded portion at its opposite end.

6. A hose coupling of the character described comprising a sleeve having a circumferential recess formed internally in its forward end, gripping members supported within said recess and extending forwardly therefrom, and a coupling nut adapted to be secured to said sleeve and to actuate said gripping members.

7. A coupling of the character described comprising a sleeve having its inner surface provided with a circumferentially grooved recess at its forward end forming an inwardly extending flange, gripping members extending within said grooved recess and provided with grooves adapted to receive said flange, and a coupling nut adapted to be secured to said sleeve and to actuate said gripping members.

8. The combination of a pipe, and a coupling comprising a sleeve slidably mounted thereon, gripping members operatively connected to said sleeve and slidable therewith, and a coupling nut adapted to be secured to said sleeve and to actuate said gripping members to hold the sleeve and gripping members against movement on said pipe.

9. The combination of a pipe, and a coupling comprising a sleeve slidably mounted thereon, gripping members operatively connected to said sleeve and slidable therewith, said gripping members extending towards the end of the pipe, and a coupling nut adapted to be secured to said sleeve and to actuate said gripping members to hold the sleeve and gripping members against movement.

10. A hose coupling of the character described, comprising a sleeve, depressible gripping members pivotally associated therewith, resilient means for holding said gripping members in spread position, and a coupling nut adapted to be secured to said sleeve and to depress said gripping members.

11. A coupling of the character described, comprising a sleeve, depressible gripping members operatively associated therewith and having registering recesses in their inner surfaces, a spring positioned within said recesses for holding said gripping members in position, and a coupling nut adapted to be secured to said sleeve and to depress said gripping members.

12. The combination of a pipe, and a coupling comprising a sleeve slidably mounted thereon, gripping members operatively associated with said sleeve and slidable therewith, means for holding said gripping members in spread position and out of gripping engagement with the pipe during the sliding movement of said sleeve and said gripping members, and a coupling nut adapted to be secured to said sleeve and to actuate said gripping members to hold said sleeve and said gripping members against movement.

13. The combination of a pipe, a coupling member slidingly mounted thereon, a second coupling member adapted to be secured to said first coupling member and having a shoulder registering with the end of the pipe, packing interposed between said shoulder and the end of the pipe, and pipe engaging means for holding said first coupling member against movement relative to the pipe as said coupling members are assembled, whereby said second coupling member will be forced to move towards said first coupling member thereby compressing said packing to form a fluid-tight joint between the end of the pipe and said second coupling member.

14. The combination of a pipe, a coupling member mounted thereon a second coupling member adapted to be secured to said first coupling member and having an abrupt transverse shoulder inside of the same, packing engaging said shoulder and adapted to be compressed against the pipe, and pipe engaging means arranged within the coupling members and adapted to be compressed into gripping engagement with the pipe by relative movement of said coupling members, said pipe engaging means being constructed to interpose resistance to the longitudinal movement of the first coupling member as the coupling members are drawn together, whereby said second coupling member will be drawn up against said packing.

15. The combination of a pipe including a flexible metal portion and a covering therefor including rubber, a coupling member mounted on said pipe, a second coupling member having screw-threaded engagement with said first coupling member and having an abrupt internal shoulder, a packing engaging said shoulder and adapted to abut against the cover portion of said pipe so as to exclude the substance passing through the pipe from contact with said cover and pipe gripping means interposed between said coupling members and adapted to be caused to firmly grip said pipe as said coupling members are screwed together.

16. The combination of a pipe including a flexible metal portion and a covering therefor including rubber, a coupling member mounted on said pipe, a second coupling member having screw-threaded engagement with said first coupling member and having an abrupt internal shoulder, a packing engaging said shoulder and adapted to abut against the cover portion of said pipe so as to exclude the substance passing through the pipe from contact with said cover and pipe gripping means interposed between said coupling members and adapted to be caused to firmly grip said pipe as said coupling members are screwed together, said gripping means tapering towards the end of the pipe and said second coupling member being formed with a tapering bore adapted to engage the tapered portion of the gripping means.

17. A coupling of the character described, comprising a pair of coupling members adapted to be screwed together, one of said coupling members having an opening therethrough for a pipe and the second coupling member having an internal shoulder therein, and a packing fitting against said shoulder, said second coupling member having a tapered bored portion, and pipe gripping means mounted within the coupling members, having a forwardly extending tapered portion adapted to co-act with the tapered bore in the second coupling member.

18. A coupling of the character described, comprising a pair of coupling members adapted to be detachably connected to one another, one of said coupling members having an opening to receive a pipe and the second coupling member having an abrupt internal shoulder and a packing fitting against the same and having a tapered bore, and pipe gripping means positioned within the coupling members and including a portion divided into segments tapered in the direction of said shoulder and adapted to co-act with the tapered bore in the second coupling member.

19. In a coupling adapted to be connected to the end of a pipe, a coupling member provided with screw threads and adapted to be slipped upon the pipe, pipe gripping means connected to one end of said coupling member and extending toward the end of the pipe, and another coupling member provided with screw threads co-operating with the threads of said first-named coupling member and adapted to engage said pipe gripping means and force it into engagement with the pipe.

In testimony whereof I hereunto affix my signature.

SAMUEL LEVITT.